(12) United States Patent
Kobayashi

(10) Patent No.: US 9,729,703 B2
(45) Date of Patent: Aug. 8, 2017

(54) MOBILE TERMINAL, NON-TRANSITORY COMPUTER READABLE RECORDING MEDIUM, AND NOTIFICATION CONTROL METHOD

(71) Applicant: KYOCERA CORPORATION, Kyoto (JP)

(72) Inventor: Hiroki Kobayashi, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/249,017

(22) Filed: Aug. 26, 2016

(65) Prior Publication Data
US 2016/0366273 A1 Dec. 15, 2016

Related U.S. Application Data

(63) Continuation of application No. PCT/JP2015/068272, filed on Jun. 24, 2015.

(30) Foreign Application Priority Data

Jun. 24, 2014 (JP) .............................. 2014-129312

(51) Int. Cl.
*G06F 3/041* (2006.01)
*G06F 3/0488* (2013.01)
(Continued)

(52) U.S. Cl.
CPC ...... *H04M 1/72583* (2013.01); *G06F 1/1643* (2013.01); *G06F 1/1684* (2013.01);
(Continued)

(58) Field of Classification Search
CPC .... G06F 1/3203; G06F 1/3206; G06F 1/3209; G06F 1/3231; G06F 1/3246;
(Continued)

(56) References Cited

U.S. PATENT DOCUMENTS

| 2009/0005011 A1* | 1/2009 | Christie | ............... G06Q 10/107 |
| | | | 455/412.2 |
| 2010/0060590 A1* | 3/2010 | Wilson | .................. G06F 3/0418 |
| | | | 345/173 |

(Continued)

FOREIGN PATENT DOCUMENTS

| JP | 2012-194791 | 10/2012 |
| JP | 2012-247967 | 12/2012 |

(Continued)

OTHER PUBLICATIONS

International Search Report in International Patent Application No. PCT/JP2015/068272, dated Aug. 18, 2015, in 2 pages.

(Continued)

*Primary Examiner* — Michael J Eurice
(74) *Attorney, Agent, or Firm* — Duane Morris LLP

(57) ABSTRACT

A mobile terminal, a non-transitory computer readable recording medium, and a notification method are disclosed. A proximity sensor detects the proximity of an object. An illumination sensor detects an illumination. A processor provides a specific notification upon detection of a touch operation when the proximity sensor detects the proximity of the object and the illumination is smaller than a predetermined value.

14 Claims, 14 Drawing Sheets

(51) Int. Cl.
*H04M 1/725* (2006.01)
*H04M 1/00* (2006.01)
*H04M 1/247* (2006.01)
*G06F 3/01* (2006.01)
*G06F 3/14* (2006.01)
*G06F 1/16* (2006.01)
*G06F 1/32* (2006.01)
*G06F 3/0481* (2013.01)
*H04W 4/02* (2009.01)

(52) U.S. Cl.
CPC ............ *G06F 3/016* (2013.01); *G06F 3/0416* (2013.01); *G06F 3/0488* (2013.01); *G06F 3/14* (2013.01); *H04M 1/00* (2013.01); *H04M 1/247* (2013.01); *G06F 1/3203* (2013.01); *G06F 1/3206* (2013.01); *G06F 1/3209* (2013.01); *G06F 1/3231* (2013.01); *G06F 1/3246* (2013.01); *G06F 1/3287* (2013.01); *G06F 1/3296* (2013.01); *G06F 3/0418* (2013.01); *G06F 3/04817* (2013.01); *G06F 2203/04108* (2013.01); *G09G 2330/022* (2013.01); *G09G 2360/144* (2013.01); *H04W 4/023* (2013.01)

(58) Field of Classification Search
CPC .... G06F 1/3287; G06F 1/3296; G06F 3/0416; G06F 3/0418; G06F 3/04817; G09G 2330/022; G09G 2360/144
See application file for complete search history.

(56) References Cited

U.S. PATENT DOCUMENTS

| | | | | |
|---|---|---|---|---|
| 2011/0205178 A1* | 8/2011 | Yoshida | ............... | G06F 1/1616 345/173 |
| 2012/0154293 A1* | 6/2012 | Hinckley | .............. | G06F 1/1694 345/173 |
| 2014/0125618 A1* | 5/2014 | Panther | ................ | A61B 5/6838 345/173 |
| 2014/0208128 A1* | 7/2014 | Gyorfi | ..................... | G06F 9/542 713/300 |
| 2014/0292396 A1* | 10/2014 | Bruwer | ................ | H03K 17/955 327/517 |
| 2015/0334570 A1 | 11/2015 | Nade | | |

FOREIGN PATENT DOCUMENTS

| | | |
|---|---|---|
| JP | 2013-062718 | 4/2013 |
| JP | 2014-045517 | 3/2014 |
| JP | 2014-099071 | 5/2014 |

OTHER PUBLICATIONS

Written Opinion of the International Searching Authority in International Patent Application No. PCT/JP2015/068272, dated Aug. 18, 2015, and Statement of.
Relevance of Non-English References Cited Therein, in 7 pages.

\* cited by examiner

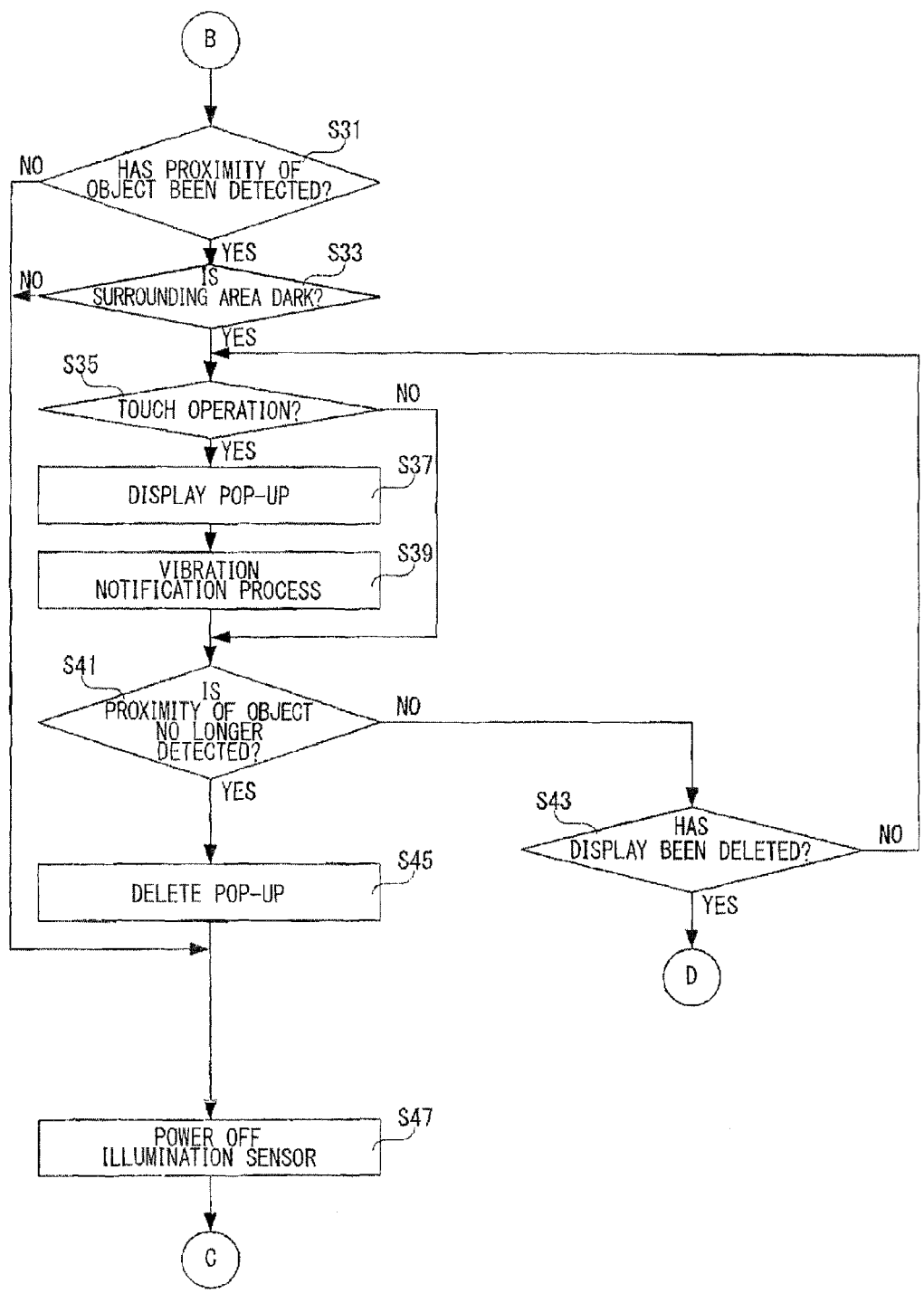
F I G. 11

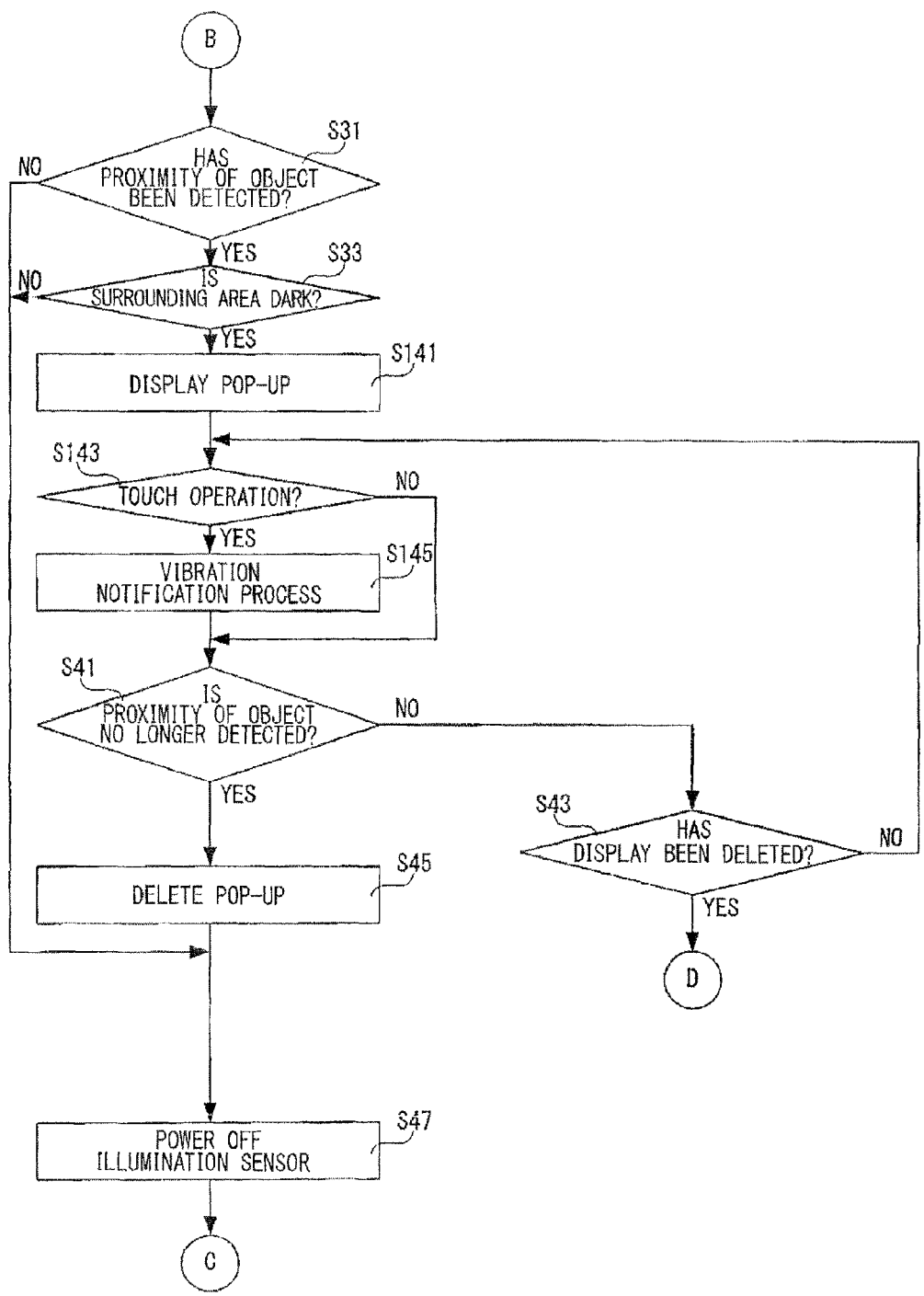
F I G. 1 5

MOBILE TERMINAL, NON-TRANSITORY COMPUTER READABLE RECORDING MEDIUM, AND NOTIFICATION CONTROL METHOD

CROSS-REFERENCE TO RELATED APPLICATION

The present application is a continuation of International Application No. PCT/JP2015/068272, filed on Jun. 24, 2015, which claims the benefit of Japanese Patent Application No. 2014-129312, filed on Jun. 24, 2014. International Application No. PCT/JP2015/068272 is entitled "PORTABLE TERMINAL, RECORDING MEDIUM, AND NOTIFICATION CONTROL METHOD" and Japanese Patent Application No. 2014-129312 is entitled "MOBILE TERMINAL, NOTIFICATION CONTROL PROGRAM AND NOTIFICATION CONTROL METHOD". The content of these applications is incorporated herein by reference in their entirety.

FIELD

Embodiments of the present disclosure relate to a mobile terminal.

BACKGROUND

Various techniques have conventionally been proposed for mobile terminals.

SUMMARY

A mobile terminal, a non-transitory computer readable recording medium, and a notification control method are disclosed. In one embodiment, a mobile terminal comprises a touch panel, a proximity sensor, an illumination sensor, and a processor. The proximity sensor detects the proximity of an object. The illumination sensor detects an illumination. The processor provides a specific notification upon detection of a touch operation when the proximity sensor detects the proximity of the object and the illumination is smaller than a predetermined value.

In one embodiment, a non-transitory computer readable recording medium stores a notification control program for controlling a processor of a mobile terminal comprising a touch panel, a proximity sensor configured to detect the proximity of an object, and an illumination sensor configured to detect an illumination. The notification control program causes the processor to execute the step of providing a specific notification upon detection of a touch operation when the proximity sensor detects the proximity of an object and the illumination is smaller than a predetermined value.

In one embodiment, a notification control method by a mobile terminal comprising a touch panel, a proximity sensor configured to detect the proximity of an object, and an illumination sensor configured to detect an illumination comprises providing, by a processor of the mobile terminal, a specific notification upon detection of a touch operation when the proximity sensor detects the proximity of the object and the illumination is smaller than a predetermined value.

BRIEF DESCRIPTION OF THE DRAWINGS

FIG. 11 illustrates a flowchart showing the example of the notification control process according to the first embodiment by the processor.

FIG. 15 illustrates a flowchart showing an example of the notification control process according to the second embodiment by the processor.

DETAILED DESCRIPTION

First Embodiment

Figure 1:
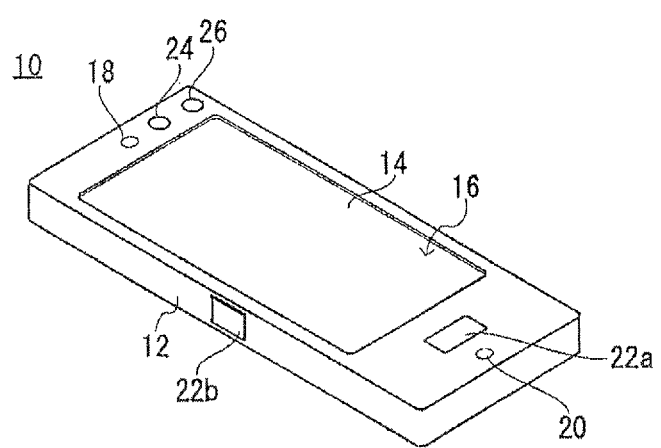
FIG. 1 illustrates an example of an external appearance of a mobile phone.

A mobile phone 10 illustrated in FIG. 1 is, for example, a smartphone and includes a vertically long, flat, and rectangular housing 12. It is pointed out in advance that embodiments of the present disclosure are applicable to any mobile terminals including tablet terminals, tablet PCs, and personal digital assistants (PDAs).

On the main surface (front surface) of the housing 12 is provided a display 14 that comprises, for example, liquid crystal panel or organic electroluminescent (EL) panel and functions as a display unit. On the display 14 is provided a touch panel 16.

A speaker 18 is built in at the main surface side of one vertical end of the housing 12, and a microphone 20 is built in at the main surface side of the other vertical end of the housing 12.

For example, a menu key 22a is provided on the main surface of the housing 12 as a hard key constituting an input operation unit together with the touch panel 16. A power supply key 22b is provided on the side surface of the housing 12.

Further, to the right of the speaker 18 are provided a proximity sensor 24 and an illumination sensor 26. Here, a detection surface of the proximity sensor 24 and a detection surface of the illumination sensor 26 are provided so as to be exposed from the housing 12, and the other portions are built in the housing 12.

For example, the user performs a touch operation on a dial pad displayed on the display 14 to enter a telephone number, and also performs a touch operation on an incoming telephone key 64 (see FIG. 3) displayed on the display 14 to start a voice call. When a voice call starts, a hang-up key is displayed on the display 14. When a touch operation is performed on the hang-up key, the voice call ends.

When the menu key 22*a* is operated, a home screen appears on the display 14. In this state, the user can perform, through the touch panel 16, a touch operation on a graphical user interface (GUI) such as icons and keys displayed on the display 14 to select, for example, icons and keys, thus confirming the selection.

The user can long press the power supply key 22*b* to power on or off the mobile phone 10. When the power supply key 22*b* is short pressed with the screen displayed on the display 14, the display 14 and the touch panel 16 are powered off.

The GUI such as icons and soft keys displayed on the display 14 may be collectively referred to as an object in the description below.

The touch operation is an operation including a finger's touch (contact) on the surface of the touch panel 16. Examples of the touch operation include a tap operation, a long tap operation, a flick operation, and a swipe (slide) operation.

The tap operation is an operation of bringing the finger into contact (touch) with the surface of the touch panel 16 and, in a short period of time, moving the finger off (releasing the finger from) the surface of the touch panel 16. The long tap operation is an operation of keeping the finger in contact with the surface of the touch panel 16 for a predetermined period of time or longer, and then, moving the finger off the surface of the touch panel 16. The flick operation is an operation of bringing the finger into contact with the surface of the touch panel 16 and flicking the finger at a predetermined speed or higher in any direction. The swipe (slide) operation is an operation of moving the finger in any direction while keeping the finger in contact with the surface of the touch panel 16, and then, moving the finger off the surface of the touch panel 16.

The swipe operation above comprises a swipe operation of touching an object displayed on the surface of the display 14 with the finger and then moving the object, or, a so-called drag operation. An operation of moving the finger off the surface of the touch panel 16 after the drag operation is referred to as a drop operation.

In the description below, the tap operation, long tap operation, flick operation, swipe operation, drag operation, and drop operation each may also be described without "operation". The touch operation may be performed not only with the user's finger but also with, for example, a stylus pen.

Figure 2:
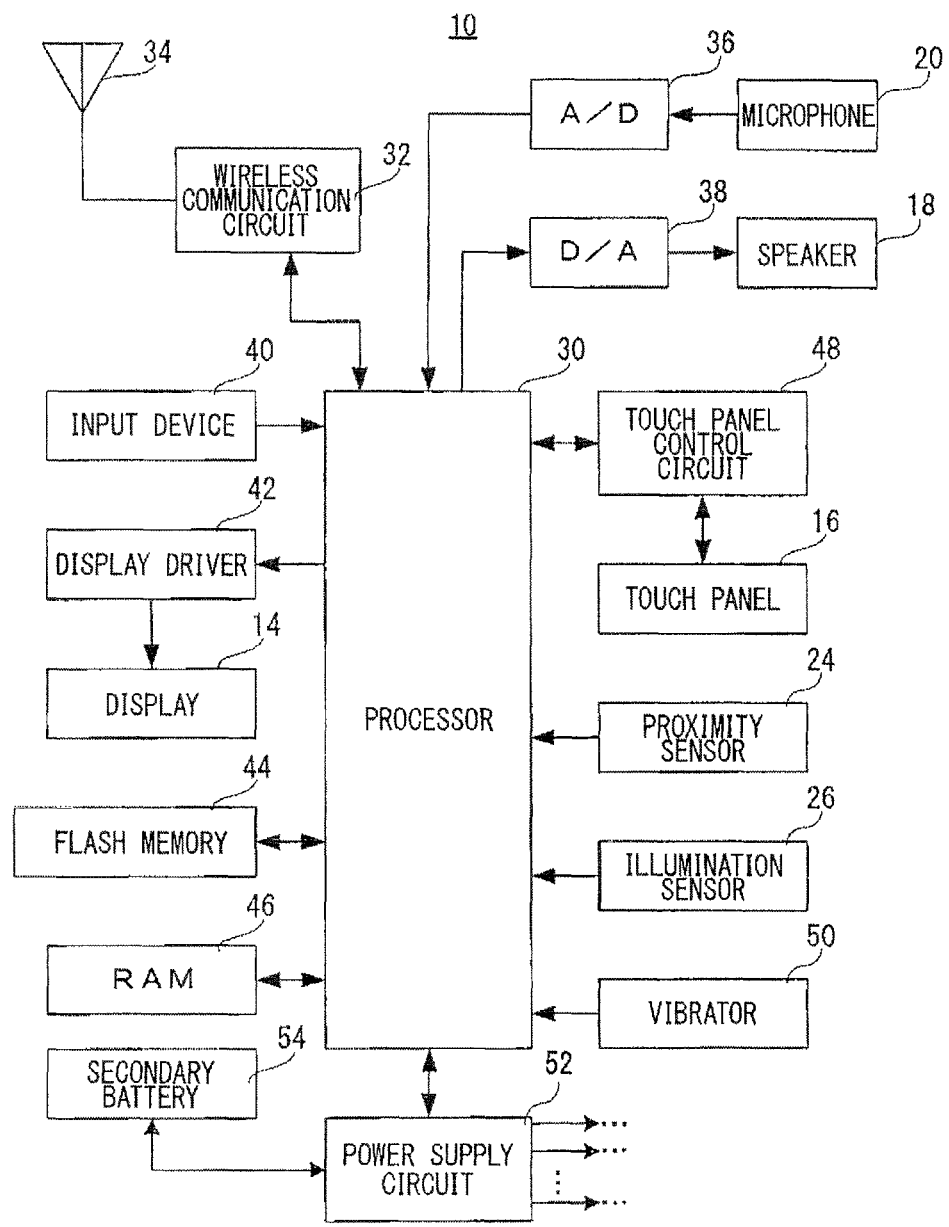
FIG. 2 is an illustration of an electrical configuration of the mobile phone.

With reference to FIG. 2, the mobile phone 10 illustrated in FIG. 1 includes a computer or a processor 30 that is a CPU. The processor 30 is connected with, for example, the proximity sensor 24, the illumination sensor 26, a wireless communication circuit 32, an A/D converter 36, a D/A converter 38, an input device 40, a display driver 42, a flash memory 44, a RAM 46, a touch panel control circuit 48, a vibrator 50, and a power supply circuit 52.

The processor 30 can perform overall control of the mobile phone 10. In the RAM 46 that is a storage, all or some of the programs preset in the flash memory 44 are expanded in use, and the processor 30 can operate in accordance with the programs on the RAM 46. The RAM 46 is further used as a working area or buffer area of the processor 30.

The input device 40 includes hard keys (the menu key 22*a* and the power supply key 22*b*) illustrated in FIG. 1. The input device 40 can thus accept key operations performed on the hard keys. When accepting the input operation performed on the hard key, the input device 40 can enter the information of the hard key (key data) into the processor 30.

The wireless communication circuit 32 is a circuit for transmitting and receiving radio waves for voice calls and emails through an antenna 34. The wireless communication circuit 32 is, for example, a circuit for wireless communications based on Code Division Multiple Access (CDMA) scheme. In one example, based on an outgoing call (voice transmission) operation accepted by the touch panel 16, the wireless communication circuit 32 can perform a voice transmission process under the instruction of the processor 30 and output a voice transmission signal through the antenna 34. The voice transmission signal is transmitted to a party's telephone via a base station and a communication network. When the party's telephone performs a voice reception process, a communicable state is established, so that the processor 30 performs a call process.

The A/D converter 36 is connected with the microphone 20 illustrated in FIG. 1. As described above, a voice signal from the microphone 20 is converted into digital voice data by the A/D converter 36, and the voice data is entered into the processor 30. The D/A converter 38 is connected with the speaker 18 illustrated in FIG. 1. The D/A converter 38 can convert the digital voice data into a voice signal and output the voice signal to the speaker 18 through an amplifier. The voice based on the voice data is thus output from the speaker 18. During the execution of the call process, the voice picked up by the microphone 20 is transmitted to the party's telephone, and the voice picked up by the party's telephone is output from the speaker 18.

The display driver 42 is connected with the display 14 illustrated in FIG. 1. The display 14 can thus display a video or an image in accordance with a video or an image output from the processor 30. The display driver 42 includes a video memory for temporarily storing image data to be displayed. The video memory stores the data output from the processor 30. The display driver 42 then displays an image on the display 14 in accordance with the contents of the video memory. In other words, the display driver 42 controls a display of the display 14 connected to the display driver 42 under the instruction of the processor 30. The processor 30 may thus be referred to as a display controller. The display 14 is provided with a backlight, and the display driver 42 can control the brightness and turn-on or turn-off of the backlight in accordance with the instruction of the processor 30.

The touch panel control circuit 48 is connected with the touch panel 16 illustrated in FIG. 1. The touch panel control circuit 48 can provide a necessary voltage or the like to the touch panel 16 and also enter, into the processor 30, a touch start signal indicating the start of a touch performed on the touch panel 16, an end signal indicating the end of the touch, and coordinate data indicating a position of the touch. The processor 30 can thus determine an object that has been touched based on the coordinate data and a change in the coordinate data.

For example, the touch panel 16 is a capacitive touch panel for detecting a change in the capacitance generated between its surface and an object such as a finger (hereinafter collectively referred to as a finger for convenience' sake). The touch panel 16 can detect that, for example, one or more fingers have touched the touch panel 16. The touch panel 16 may thus be referred to as a pointing device. The touch panel control circuit 48 can detect a touch within a touch-enabled range of the touch panel 16 and output the coordinate data indicating the position of the touch to the processor 30. In other words, the user can perform a touch operation on the surface of the touch panel 16 to enter an operation position, an operation direction, and the like into the mobile phone 10. The touch panel control circuit 48 can also detect an amount of change in capacitance in the touch operation performed on the touch panel 16.

In the touch panel 16, a high sensitivity mode can be set in which a touch can be detected by the user even with a gloved hand. Specifically, a mode is set automatically in accordance with an amount of change in capacitance of a first touch when the touch operation starts. For example, if an amount of change in capacitance is smaller than a threshold (first threshold), it is determined that a touch is made with gloves, and a setup value for determining that a touch has been made is set to a value smaller than a normal setup value. The state in which the setup value for determining that a touch has been made is set to a value smaller than the normal setup value is referred to as a high sensitivity mode. In contrast, the state in which the setup value for determining that a touch has been made is set to the normal setup value is referred to as a normal mode. In the high sensitivity mode, a touch (mere contact) is detected more easily, so that a touch operation such as a tap operation is detected more easily. The processor 30 determines that the touch panel 16 has been touched if an amount of change in the capacitance detected by the touch panel control circuit 48 is greater than the setup value for determining that a touch has been made. Letting a setup value for determining that a touch has been made in the high sensitivity mode be a "second threshold" and a setup value for determining that a touch has been made in the normal mode be a "third threshold", second threshold<first threshold<third threshold.

Although whether an amount of change in capacitance in a touch operation is greater than the setup value for determining that a touch has been made is determined by the processor 30, it may be judged by the touch panel control circuit 48.

In the mobile phone 10, the display 14 and the touch panel 16 are powered off automatically after a lapse of a predetermined period of time (for example, 15 seconds) with no operation performed.

The proximity sensor 24 includes a light emitting element (not shown) such as an infrared light emitting diode (LED) and a light receiving element (not shown) such as a photodiode. The processor 30 can calculate a distance between the proximity sensor 24 (mobile phone 10) and an object (such as the user's face or clothes) proximate to the proximity sensor 24 from a change in output of the photodiode. Specifically, the light emitting element emits infrared rays, and the light receiving element receives the infrared rays reflected off the object such as the face. For example, if the light receiving element is far from the user's face, hardly any infrared rays emitted from the light emitting element are received by. In contrast, if the user's face is proximate to the proximity sensor 24, the infrared rays emitted from the light emitting element are reflected off the face and received by the light receiving element. In this manner, the amount of infrared rays received by the light receiving element varies between the case in which the proximity sensor 24 is proximate to the user's face and in the other case. This enables the processor 30 to calculate the distance between the proximity sensor 24 and the object based on the amount of the light received. The processor 30 then determines that an object is proximate to the proximity sensor 24 when the calculated distance is smaller than a certain value. The proximity sensor 24 is used to detect the proximity of an object, so it is also referred to as a proximity detector.

The illumination sensor 26 includes photodiodes integrated in array. Upon receipt of light, each photodiode changes its output. The processor 30 detects the ambient brightness (illumination) of the mobile phone 10 based on a change in output of each photodiode. In another embodiment, photodiodes may be replaced with phototransistors. The illumination sensor 26 is used to detect the ambient illumination, so it is also referred to as an illumination detector.

The vibrator 50 is a motor with an eccentric weight attached to its rotating shaft and is controlled to be turned on or off by the processor 30. When the vibrator 50 operates (turns on), the mobile phone 10 also vibrates due to the vibrations of the vibrator 50. For example, operating the vibrator 50 upon receipt of an incoming call can notify the user of an incoming call status. Operating the vibrator 50 upon detection of a touch operation notifies the user that a touch operation has been detected. In the description below, the process of operating the vibrator 50 upon detection of a touch operation is referred to as a vibration notification process.

The power supply circuit 52 comprises an IC for power supply management. The power supply circuit 52 can supply the entire system with the power that is based on the voltage across the secondary battery 54. The state in which the power supply circuit 52 is supplying power to the entire system is referred to as a power-on state, whereas the state in which the power supply circuit 52 is not supplying power to the entire system is referred to as a power-off state. As described above, the power supply circuit 52 is activated upon long press of the power supply key 22b in the power-off state (power-on operation) and is stopped upon long press of the power supply key 22b in the power-on state (power-off operation). Further, the power supply circuit 52 includes an external power supply connector (not shown) connected with an external power supply, and accordingly, even in the power-off state, the power supply circuit 52 is activated when the secondary battery 54 is supplied with power (is charged) and is stopped when the fully charged state of the secondary battery 54 is detected. "Being charged" means that the external power supply connector is connected with the external power supply and receives a power supply from the external power supply, and accordingly, the secondary battery 54 stores electrical energy. The power supply circuit 52 and the secondary battery 54 may be collectively referred to as a power supply unit.

Figure 3:
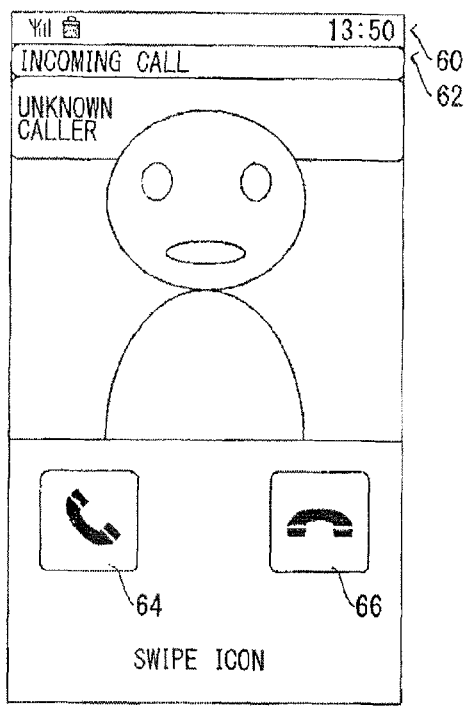
FIG. 3 is an illustration of an example of an incoming call screen.

FIG. 3 is an illustration of an example of an incoming call screen displayed while an incoming call is received. With reference to FIG. 3, a display range of the display 14 includes a status display area 60 and a function display area 62. In the status display area 60 are displayed a pictogram indicating a status of a radio wave received by the antenna 34, a pictogram indicating a remaining battery capacity of the secondary battery 54, and a time. The incoming call screen is displayed in the function display area 62. The incoming call screen includes a text indicating that an incoming call is being received, a text and an image indicating a caller, two keys for response, and a text for describing an operation.

In the case in which address data including a name and an image of a party (caller) is registered in association with the telephone number of the party, the text and image indicating the caller are displayed based on the address data. If such address data is not registered, "unknown caller" is displayed on the incoming call screen, and an image indicating that the caller is unknown is displayed.

The two keys for response include an incoming telephone key 64 and a hold key 66. When a swipe operation is performed on the incoming telephone key 64 while an incoming call is received, a communicable state is established, so that the processor 30 performs a call process. In other words, the user can perform a touch operation on the incoming telephone key 64 to start a call with the caller. When the swipe operation is performed on the hold key 66 while an incoming call is received, an incoming-call-enabled state is established, so that the processor 30 performs a hold process. When the hold process is performed, for example, a voice massage informing that a call cannot be answered is transmitted to the caller's telephone. In other words, the user can perform a touch operation on the hold key 66 to inform the caller that the user cannot answer the incoming call.

On the incoming call screen and the next call screen, the touch operation on the touch panel 16 is limited while the proximity sensor 24 detects the proximity of an object. In other words, the mobile phone 10 is brought close to the user's face during, for example, a call, and accordingly, the touch panel 16 may detect the user's face, so that the mobile phone 10 may malfunction. Thus, when the proximity sensor 24 detects the proximity of an object while an incoming call is received and while a call is made, the touch operation is limited so as to avoid the execution of an operation such as a process corresponding to the key operation even if the touch operation is performed on the touch panel 16.

To avoid an incorrect operation due to an unintended input to the touch panel 16 by the user, the mobile phone 10 can set a lock state in which the execution of a predetermined process based on the touch operation is limited. For example, when the power supply key 22b is operated, the display 14 and the touch panel 16 are powered off, and also, the lock state is set. When the menu key 22a is operated in this state, the display 14 and the touch panel 16 are powered on, and the lock screen is displayed, so that the operation of releasing the lock state can be accepted. Also when the display 14 is powered off automatically, the lock state is set. In the lock state, the display 14 and the touch panel 16 are powered off until the lock screen is displayed, thus reducing power consumption of the mobile phone 10.

Figure 4:
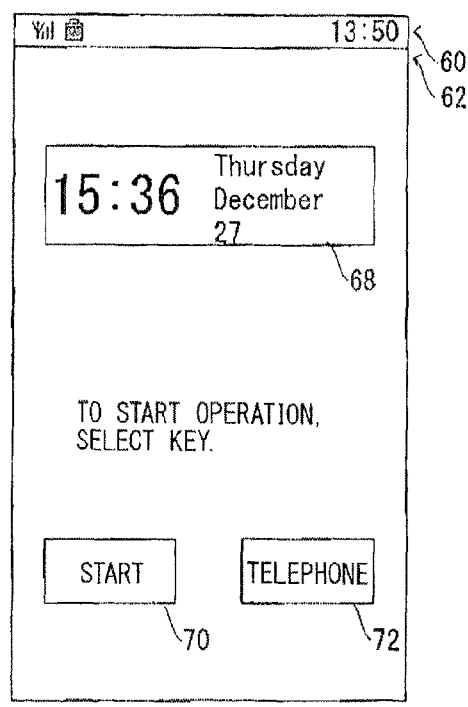
FIG. 4 is an illustration of an example of a lock screen.

FIG. 4 is an illustration of an example of the lock screen. With reference to FIG. 4, when, for example, the menu key 22a or the power supply key 22b is operated in the lock state, the lock screen is displayed in the function display area 62. The lock screen includes a time and date icon 68 indicating a current time and date, on which two keys for accepting a release operation are displayed. The two keys include a start key 70 for releasing the lock state and a telephone key 72 for releasing the lock state and also executing a telephone function.

Figure 5:
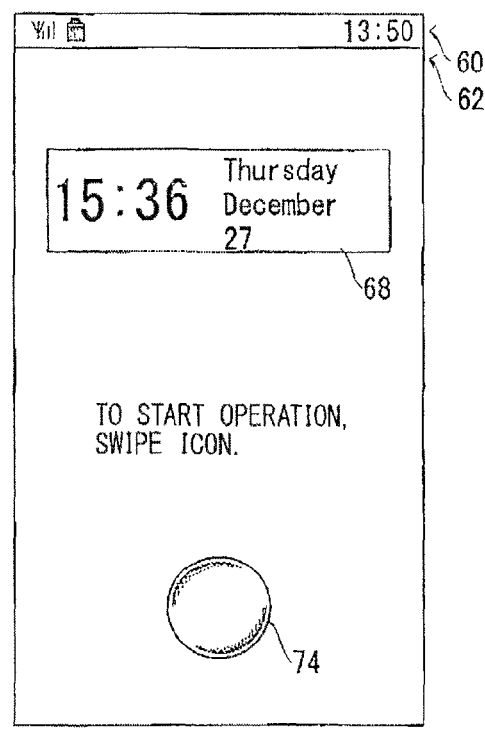
FIG. 5 is an illustration of an example of an operation lock screen.

For example, when the tap operation is performed on the start key 70, the tap operation is accepted as the release operation, and the lock state is accordingly released. Then, when the lock state is released using the start key 70, the operation lock screen illustrated in FIG. 5 is displayed. The operation lock screen displays the time and date icon 68 and a start icon 74. Then, when a swipe operation (start operation) is performed on the start icon 74 in any direction for a predetermined distance or more, the operation lock state is released, and the home screen appears. In other words, with the lock state set, the user can display the home screen by performing the release operation on the lock screen and then performing the start operation on the operation lock screen.

In place of the operation lock screen, a password lock screen for accepting an input of a password may be displayed. After the lock state is released, the operation lock screen illustrated in FIG. 5 may not be displayed but the home screen may be displayed. Further, the operation lock screen may be displayed as the lock screen.

When a tap operation is performed on the telephone key 72, the tap operation is accepted as a release operation, so that the lock state is released. Then, when the lock state is released using the telephone key 72, a calling screen including a dialing key is displayed. Then, the user can perform a calling operation after entering any telephone number on the calling screen to make a call to any party. When an incoming call is received in the lock state, not the lock screen illustrated in FIG. 4 but the incoming call screen illustrated in FIG. 3 is displayed.

When the lock screen is displayed or the incoming call screen is displayed in the lock state, whether the user performs a touch operation with gloves needs to be determined, and thus, the sensitivity of the touch panel 16 is set to the high-sensitivity mode. Thus, even when the user displays the lock screen or the like with gloves, the operation of releasing the lock state can be accepted.

However, when the lock screen or the incoming call screen is displayed while the mobile phone 10 in which the lock state is set is put in the pocket of user's clothes, the touch panel 16 set to the high sensitivity mode may detect the user's body such as the leg through the clothes. Then, when the touch panel 16 detects the user's body, the following malfunction may conceivably occur: the setting of the mobile phone 10 may be changed against the user's will, or an incoming call may be answered against the user's will.

Thus, the mobile phone 10 uses the proximity sensor 24 and the illumination sensor 26 to determine the state in which the mobile phone 10 is put in the pocket of the user's clothes, and when determining that the mobile phone 10 is put in the pocket, provides a specific notification to make practically disable the touch operation.

Figure 6:
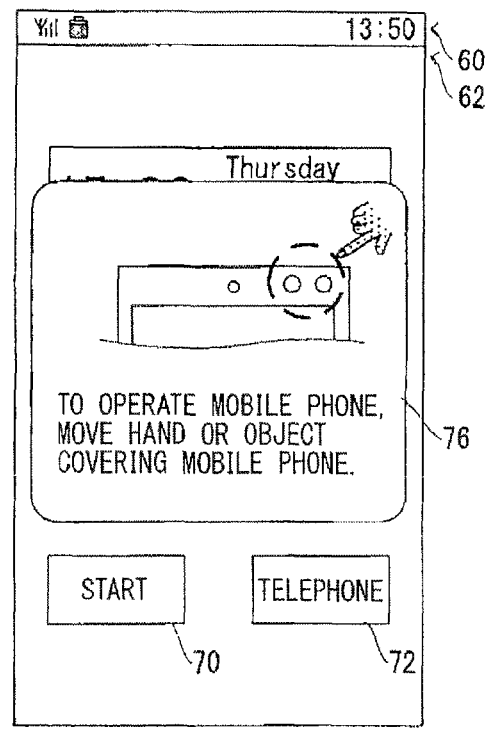
FIG. 6 is an illustration of an example of a state in which a pop-up is displayed on the lock screen in an overlapping manner.

Specifically, when an event such as a key operation or an incoming call occurs and the display 14 of the mobile phone 10 is accordingly powered on, the proximity sensor 24 and the illumination sensor 26 are powered on. In this case, when the proximity sensor 24 detects the proximity of an object and the illumination detected by the illumination sensor 26 is smaller than a predetermined value, or, it is determined that the surrounding area of the mobile phone 10 is dark, the mobile phone 10 determines that it is put in the pocket. When the touch operation is performed on the touch panel 16 after the determination as described above, for example, a pop-up 76 as illustrated in FIG. 6 is displayed, and the vibrator 50 performs the vibration notification process. Then, while the mobile phone 10 is put in the pocket, the pop-up 76 is displayed even when any position of the touch panel 16 is touched, and the vibration notification process is performed. In other words, the pop-up 76 is displayed or the vibration notification process is performed upon detection of a touch operation when the proximity of an object is detected and the detected illumination is smaller than a predetermined value while the mobile phone 10 is put in, for example, the pocket. Then, such a notification is made in the state above to practically disable the touch operation and lower the risk of malfunction.

With reference to FIG. 6, at the occurrence of, for example, a key operation event, the lock screen is displayed after the display 14 is powered on. When the mobile phone 10 determines that it is put in the pocket and the touch operation is performed on any position of the touch panel 16 in this state, the pop-up 76 is displayed on the lock screen in an overlapping manner, so that the vibration notification process using the vibrator 50 is performed. As described above, the vibration notification process is performed in response to the touch operation, and accordingly, the user can notice that the touch panel 16 is not out of order. For example, when the vibration notification process is not performed in response to a touch operation, the user may misunderstand that the touch operation cannot be performed due to the touch panel 16 being out of order. However, performing the vibration notification process in response to the touch operation can reduce a risk that the user will misunderstand that the touch operation cannot be performed due to the touch panel 16 being out of order.

The pop-up 76 includes an image of the external appearance of the mobile phone 10 and a message. The image indicates the positions of the proximity sensor 24 and the illumination sensor 26. The message informs that the mobile phone 10 becomes operable by moving the hand or object covering the mobile phone 10. As described above, in the case in which the mobile phone 10 determines that it is put in the pocket, displaying the pop-up 76 in response to the touch operation can inform the user that the proximity sensor 24 and the illumination sensor 26 are inadvertently hidden.

Then, when the proximity sensor 24 no longer detects the proximity of an object or when the illumination detected by the illumination sensor 26 is greater than the predetermined value, or, the surrounding area of the mobile phone 10 becomes bright, the display of the pop-up 76 is deleted. In other words, when the mobile phone 10 determines that it is not put in the pocket, the pop-up 76 is deleted. The user can accordingly notice that the touch operation has been practically enabled.

As described above, the power consumed when the mobile phone 10 determines whether it is put in the pocket can be reduced by powering on the proximity sensor 24 and the illumination sensor 26 in response to the occurrence of an event such as a key operation. For example, if the proximity sensor 24 and the illumination sensor 26 are always powered on, the power is supplied to the proximity sensor 24 and the illumination sensor 26 even when the determination described above is not required, resulting in unnecessary power consumption. However, powering on the proximity sensor 24 and the illumination sensor 26 can reduce power consumption.

When the mobile phone 10 determines that it is no longer put in the pocket, or, when the proximity sensor 24 no longer detects the proximity of an object or the illumination detected by the illumination sensor 26 is greater than a predetermined value, the proximity sensor 24 and the illumination sensor 26 are powered off. In this manner, the proximity sensor 24 and the illumination sensor 26 are powered off when these sensors are not required, thus reducing power consumption.

Figure 7:
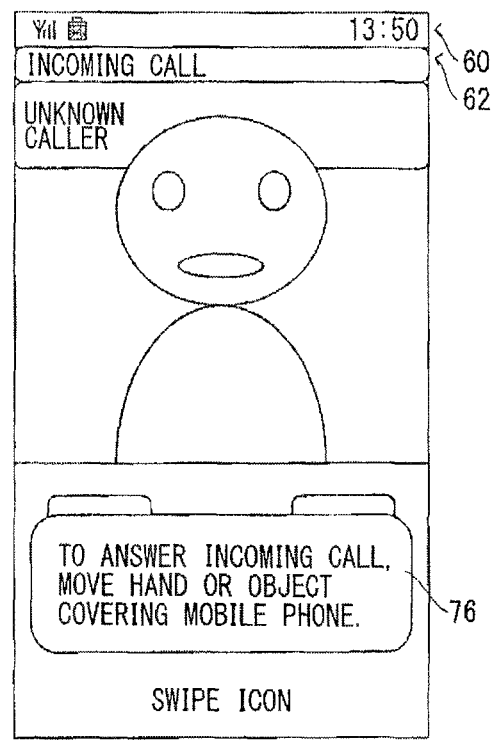
FIG. 7 is an illustration of an example of a state in which a pop-up is displayed on the incoming call screen in an overlapping manner.

With reference to FIG. 7, at the occurrence of an incoming call event, the incoming call screen is displayed after the display 14 is powered on. Also in this case, when the mobile phone 10 determines that it is put in the pocket and detects a touch operation, the pop-up 76 is displayed on the incoming call screen in an overlapping manner, and the vibration notification process is performed. Note that the pop-up 76 is displayed at the position of the incoming call screen at which an image corresponding to a caller is not hidden, for example, at the lower position of the screen. Additionally, a message is displayed but no image is displayed in the pop-up 76 displayed on the incoming call screen, and the display size of the message is smaller than that of the pop-up 76 displayed on the lock screen. The user can thus check an image related to the caller even when the pop-up 76 is displayed on the incoming call screen in an overlapping manner.

If the proximity sensor 24 no longer detects the proximity of an object in the case in which the pop-up 76 is displayed on the incoming call screen, the pop-up 76 is deleted. In other words, the user can notice that the touch operation has been practically enabled. As described above, the proximity sensor 24 limits the touch operation on the touch panel 16 while an incoming call is received, and thus, the operation on the touch panel 16 is caused to return to the practically enabled state based on the detection result of the proximity sensor 24, without using the illumination sensor 26. For example, similarly to the pop-up 76 displayed on the lock screen or the like, if the illumination detected by the illumination sensor 26 is used to enable the operation on the touch panel 16, the touch operation on the touch panel 16 may be enabled irrespective of the presence of the mobile phone 10 close to the user's face, causing a malfunction. Thus, the mobile phone 10 is configured not to cause such a malfunction.

Further, if the operation on the touch panel 16 is enabled after the occurrence of an incoming call event, the illumination sensor 26 is powered off. Then, if the mobile phone 10 is no longer put in the pocket, the proximity sensor 24 needs to detect the proximity of the user's face, and accordingly, the proximity sensor 24 remains powered on. Unnecessary power consumption can be reduced by powering off the illumination sensor 26 as described above.

While the mobile phone 10 determines that it is put in the pocket, the pop-up 76 is displayed when any position of the touch panel 16 is touched. In other words, while the mobile phone 10 determines that it is put in the pocket, approximately the entire touch panel 16 is the effective area for the touch operation. Contrastingly, on the lock screen illustrated in, for example, FIG. 4, the process corresponding to the touch operation is not performed even when the touch operation is performed on any position other than the start key 70 and the telephone key 72. In other words, on the lock screen, the display ranges (predetermined areas) of the start key 70 and the telephone key 72 are effective areas for the touch operation. This means that the effective area for the touch operation in the touch panel 16 varies between before and after the mobile phone 10 determines that it is put in the pocket. While the mobile phone 10 provides a specific notification in response to the touch operation, the pop-up 76 is displayed when the touch operation is performed on the touch panel 16, irrespective of the key display range. The user can thus perform the touch operation on any position to grasp the state of the mobile phone 10.

Even while the mobile phone 10 determines that it is put in the pocket, the pop-up 76 may be displayed when the touch operation is performed on a predetermined area, such as a key display range. The pop-up 76 can thus be displayed when the user performs the touch operation on the predetermined area.

The position at which the user performs the touch operation can be guided by setting the key display range as a predetermined area.

Also when the display 14 and the touch panel 16 are powered off due to a lapse of a predetermined period of time with no operation performed or due to the operation performed on the power supply key 22*b*, the proximity sensor 24 and the illumination sensor 26 are powered off.

When an incoming call flag 350 (FIG. 8) is turned on during the display of the lock screen, the incoming call screen is displayed in place of the lock screen. At this time, if the pop-up 76 is displayed, the pop-up 76 changes from the state of FIG. 6 to the state of FIG. 7. In other words, the content and display position of the pop-up 76 change.

Next, the action of the mobile phone 10 will be described in detail with reference to the memory map illustrated in FIG. 8 and the flowcharts illustrated in FIGS. 9 to 13.

Figure 8:
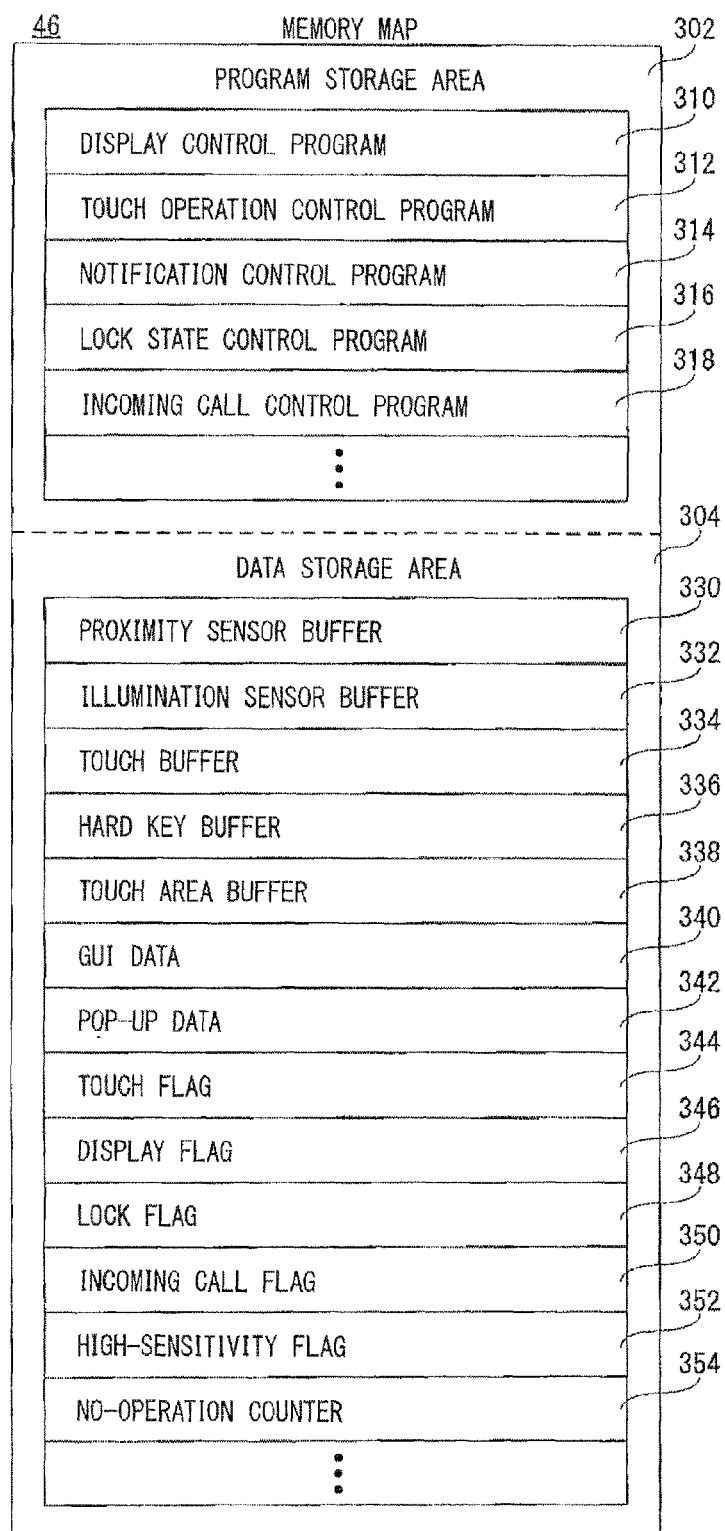
FIG. 8 is an illustration of an example of a memory map of a RAM.

With reference to FIG. 8, a program storage area 302 and a data storage area 304 are formed in the RAM 46. The program storage area 302 is, as described above, the area for reading and storing (expanding) all or some of the programs and data preset in the flash memory 44 (FIG. 2).

The program storage area 302 stores a display control program 310 for powering off the display 14 and the touch panel 16 after a lapse of a predetermined period of time with no operation performed, a touch operation control program 312 for limiting the touch operation on the touch panel 16 while an incoming call is received and while a call is made, a notification control program 314 for providing a specific notification when the mobile phone 10 determines that it is put in the pocket, a lock state control program 316 for, for example, releasing a lock state, an incoming call control program 318 to be executed when an incoming call is received, and any other program. The program storage area 302 also stores a program for calling, a program for transmitting and receiving emails, a program for managing address book data, and any other program.

The data storage area 304 of the RAM 46 includes a proximity sensor buffer 330, an illumination sensor buffer 332, a touch buffer 334, a hard key buffer 336, a touch area buffer 338, and any other buffer. The data storage area 304 stores, for example, GUI data 340 and pop-up data 342. Additionally, a touch flag 344, a display flag 346, a lock flag 348, an incoming call flag 350, a high-sensitivity flag 352, a no-operation counter 354, and the like are provided in the data storage area 304.

The proximity sensor buffer 330 temporarily stores the information on the distance between the object detected by the proximity sensor 24 and the proximity sensor 24. The illumination sensor buffer 332 temporarily stores the information on the illumination detected by the illumination sensor 26. The touch buffer 334 temporarily stores, for example, the data on touch coordinates output from the touch panel control circuit 48, an amount of change in capacitance, and the data on touch coordinates of the starting point and end point of the touch operation.

The hard key buffer 336 temporarily stores the information on the hard key (key data) entered into the processor 30. The touch area buffer 338 temporarily stores the coordinate data on the area in which the touch operation is effective on the displayed screen. For example, during the display of the lock screen illustrated in FIG. 4, the touch area buffer 338 stores the coordinate data indicating the display ranges of the start key 70 and the telephone key 72.

The GUI data 340 is the data on the GUI to be displayed for displaying the lock screen, the incoming call screen, or any other screen. The GUI data 340 thus includes image data and text data. The pop-up data 342 is the data for displaying the pop-up 76 and, similarly to the GUI data 340, includes image data and text data.

The touch flag 344 is a flag for determining whether the touch panel 16 is touched. For example, the touch flag 344 comprises a one-bit register. When the touch flag 344 is turned on (established), a data value "1" is set in the register. When the touch flag 344 is turned off (not established), a data value "0" is set in the register. The touch flag 344 is switched on or off based on the output of the touch panel control circuit 48.

The display flag 346 is a flag for determining whether the display 14 displays an image. For example, the display flag 346 is turned on when the display 14 displays an image or is turned off when the image displayed on the display 14 is deleted. The lock flag 348 is a flag for determining whether the lock state is set. For example, the lock flag 348 is turned on when the lock state is set or is turned off when the lock state is released. The incoming call flag 350 is a flag for determining whether an incoming call is being received. For example, the incoming call flag 350 is turned on when a voice transmission signal is received or is turned off when a voice transmission signal is no longer received. The high-sensitivity flag 352 is a flag for determining whether a high-sensitivity mode is set.

The configurations of these flags are approximately the same as that of the touch flag 344, and thus will not be described here in detail for the sake of brevity.

The no-operation counter 354 is a counter for measuring a time in which no operation is performed. The no-operation counter 354 is initialized when the display 14 is powered on or an event such as a key operation or an incoming call occurs, and then starts measuring a time. When the no-operation counter 354 measures a predetermined period of time, the no-operation counter 354 expires. Then, when the no-operation counter 354 expires, the display 14 and the touch panel 16 are powered off.

The data storage area 304 stores address book data or includes any other flag or timer (counter) necessary for executing a program.

Figure 9:
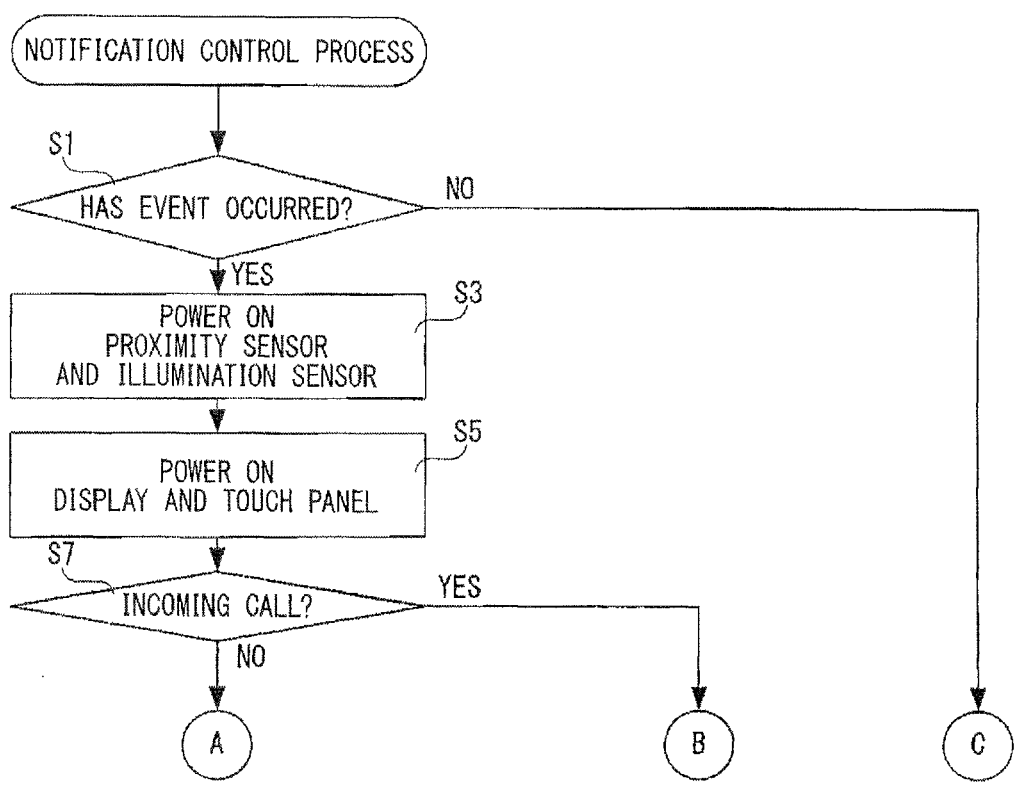
FIG. 9 illustrates a flowchart showing an example of a notification control process by a processor.
Figure 10:
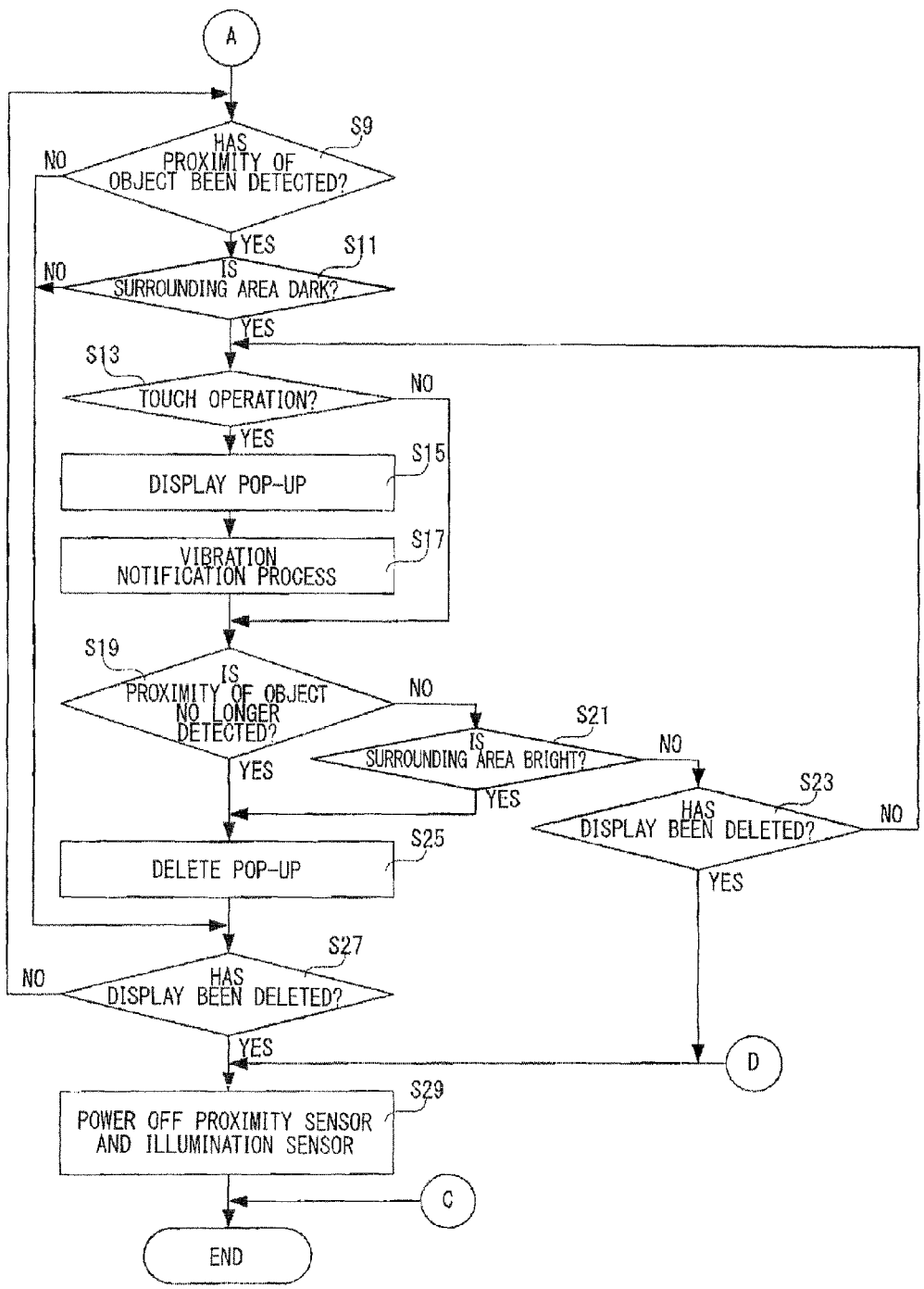
FIG. 10 illustrates a flowchart showing an example of a notification control process according to a first embodiment by the processor.
Figure 12:
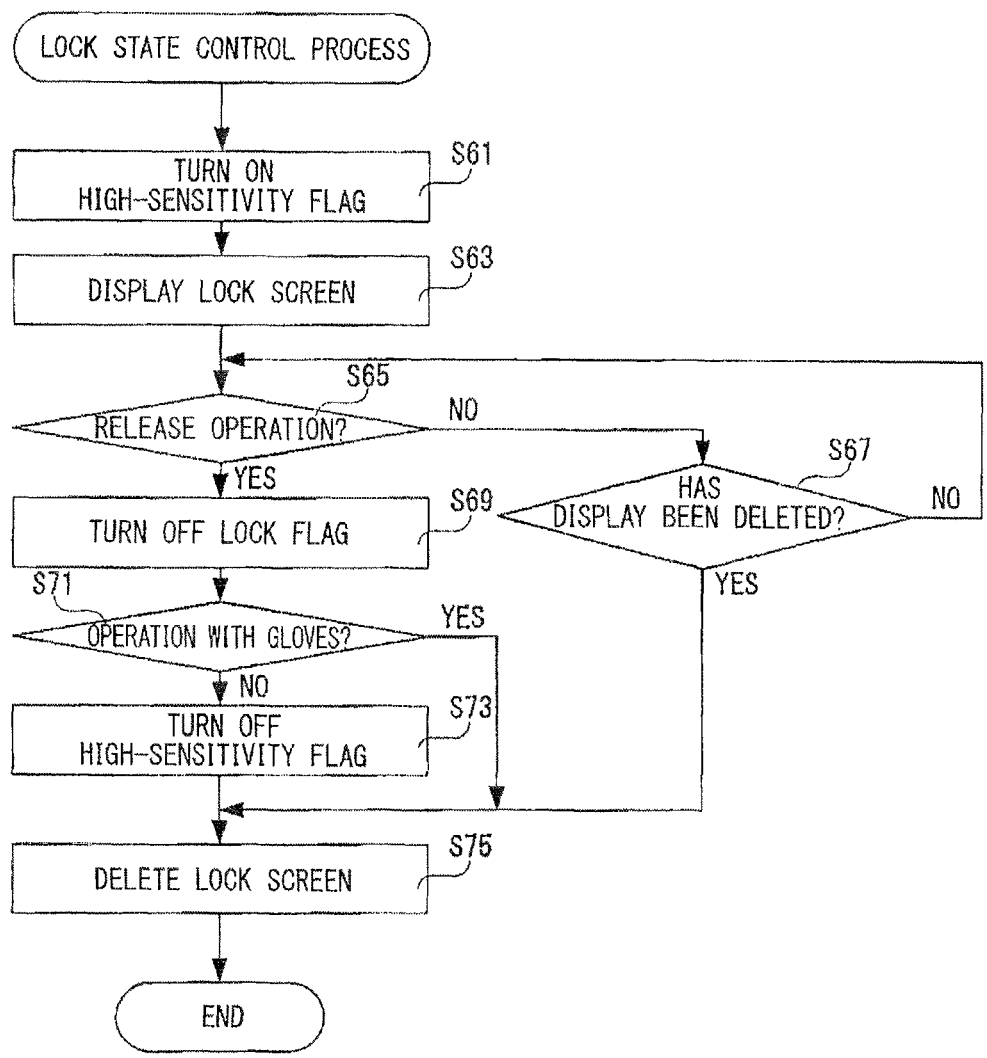
FIG. 12 illustrates a flowchart showing an example of a lock state control process by the processor.
Figure 13:
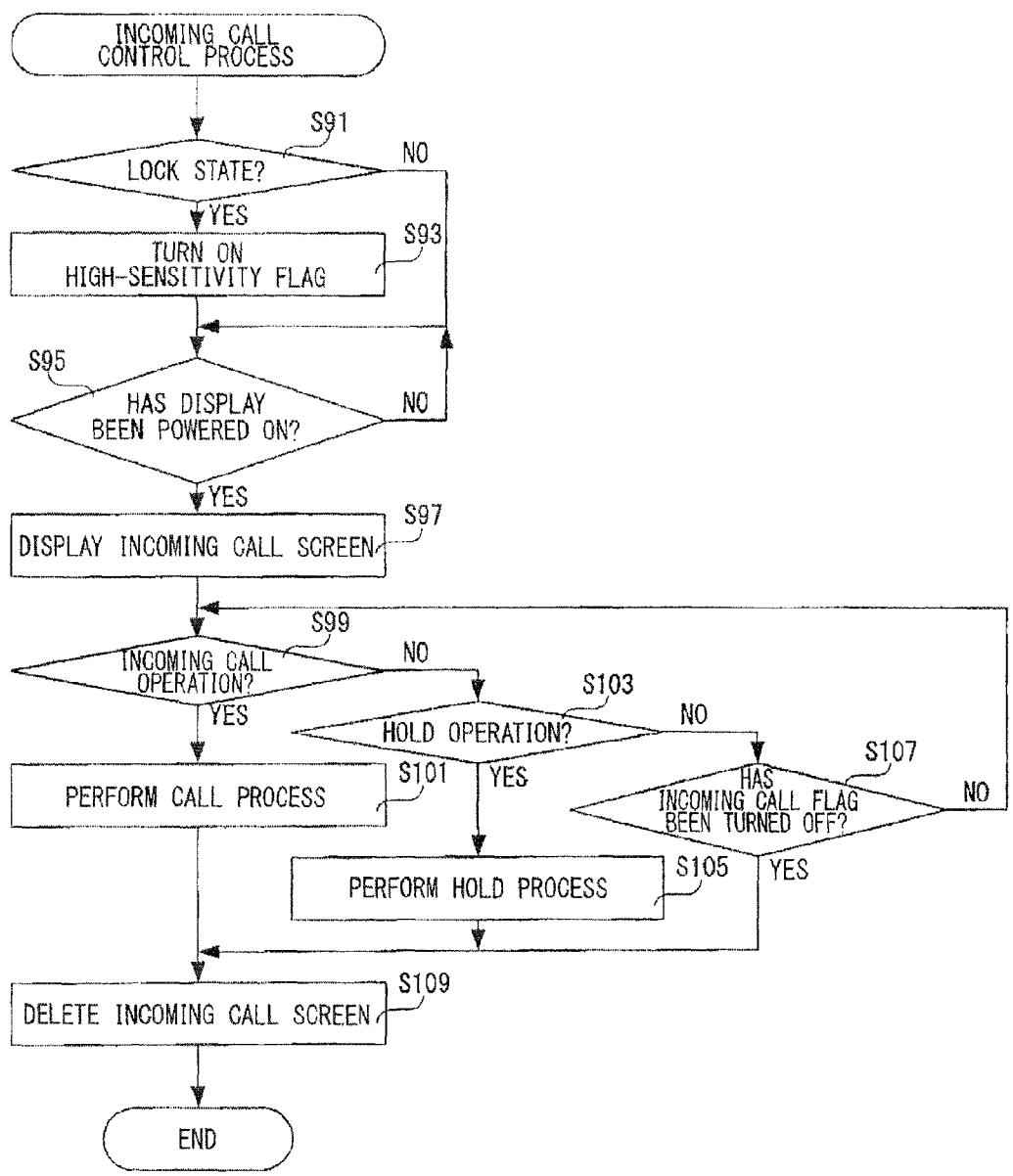
FIG. 13 illustrates a flowchart showing an example of an incoming call control process by the processor.

The processor 30 simultaneously processes a plurality of tasks including the notification control process illustrated in FIGS. 9 to 11, the lock state control process illustrated in FIG. 12, and the incoming call control process illustrated in FIG. 13 under the control of a predetermined operating system (OS) such as a Windows (registered trademark)-based OS, a Linux (registered trademark)-based OS such as Android (registered trademark), or an iOS (registered trademark).

A display control process and a touch operation control process are performed simultaneously with the processes above. The display control process powers off the display 14 and the touch panel 16 after a lapse of a predetermined period of time with no operation performed. The touch operation control process limits the touch operation on the touch panel 16 using the proximity sensor 24 while an incoming call is received and while a call is made. These two processes are well known and thus will be neither illustrated nor described.

FIG. 9 illustrates a part of the flowchart of the notification control process. For example, when the display 14 is powered off, an instruction to perform the notification control process is issued, so that the notification control process starts. The instruction to perform the notification control process is issued at regular cycles (for example, 100 ms) if the display 14 is powered off.

In step S1, the processor 30 determines whether an event has occurred. In other words, whether an event such as a key operation or an incoming call has occurred is determined. Specifically, the processor 30 determines whether the hard key buffer 336 has stored key information or the incoming call flag 350 has been turned on. If "NO" in Step S1, or, when no event has occurred, the processor 30 ends the notification control process. If "YES" in step S1, or, when a key operation event occurs, the processor 30 powers on the proximity sensor 24 and the illumination sensor 26 in step S3. In other words, these sensors are powered on to determine whether the mobile phone 10 is put in, for example, the pocket. The processor 30 that performs the process of step S3 functions as a first controller.

Subsequently, in step S5, the processor 30 powers on the display 14 and the touch panel 16. In other words, the display 14 and the touch panel 16 are powered on to display and operate the screen corresponding to the event that has occurred. Subsequently, in step S7, the processor 30 determines whether an incoming call has been received. In other words, whether the event that has occurred is an incoming call is determined. Specifically, the processor 30 determines whether the incoming call flag 350 is turned on. If "YES" in step S7, or, when the event that has occurred is an incoming call, the processor 30 proceeds to the process of step S31 illustrated in FIG. 11.

If "NO" in step S7, or, when the event that has occurred is a key operation, in step S9, the processor 30 determines whether the proximity of an object has been detected. In other words, whether an object is present in front of the mobile phone 10 is determined. Specifically, the processor 30 determines whether an object is proximate thereto based on the information on the distance stored in the proximity sensor buffer 330. If "NO" in step S9, or, when the proximity of an object has not been detected, the processor 30 proceeds to the process of step S27. If "YES" in step S9, or, when the proximity of an object has been detected, in step S11, the processor 30 determines whether the surrounding area of the mobile phone 10 is dark. In other words, the processor 30 determines whether the illumination stored in the illumination sensor buffer 332 is smaller than a predetermined value. If "NO" in step S11, or, when the surrounding area of the mobile phone 10 is bright, the processor 30 proceeds to the process of step S27.

If "YES" in step S11, or, when the proximity of an object has been detected and the surrounding area of the mobile phone 10 is dark, the processor 30 proceeds to the process of step S13. In other words, the processor 30 determines that the mobile phone 10 is put in the pocket. After such a determination, in step S13, the processor 30 determines whether a touch operation has been performed. For example, when the lock screen is displayed, the processor 30 determines whether a touch operation has been performed on the touch panel 16 at any position. If "NO" in step S13, or, when the touch operation has not been performed, the processor 30 proceeds to the process of step S19. If the determination is "YES" in step S11, the touch area buffer 338 stores the coordinate data indicating the entire area of the touch panel 16. In other words, the entire touch panel 16 is the effective area for the touch operation.

If "YES" in step S13, for example, when the tap operation is performed on the touch panel 16, the processor 30 displays the pop-up 76 in step S15 and performs the vibration notification process in step S17. For example, while the lock screen is displayed, the pop-up 76 as illustrated in FIG. 6 is displayed, and the vibrator 50 operates.

Subsequently, in step S19, the processor 30 determines whether the proximity of an object is no longer detected. In other words, the processor 30 determines whether the mobile phone 10 is no longer put in the pocket. If "YES" in step S19, or, when the proximity of an object is no longer detected, the processor 30 proceeds to the process of step S25. If "NO" in step S19, or, when the proximity of an object has been detected, in step S21, the processor 30 determines whether the surrounding area of the mobile phone 10 is bright. In other words, as in step S19, whether the mobile phone 10 is no longer put in the pocket is determined. If "NO" in step S21, in step S23, the processor 30 determines whether the display has been deleted. For example, the processor 30 determines whether the power supply key 22b has been operated and the display flag 346 has been turned off. If "YES" in step S23, for example, when the display 14 is powered off and the display flag 346 is turned off after a lapse of a predetermined period of time with no operation performed, the processor 30 performs the process of step S29 described below and then ends the notification control process.

If "NO" in step S23, for example, when the display of the display 14 does not change while the mobile phone 10 remains put in the pocket, the processor 30 returns to the process of step S13. After that, if the determination is "YES" in step S19 or S21, or, when the proximity of an object is no longer detected or the surrounding area of the mobile phone 10 becomes bright, in step S25, the processor 30 deletes the pop-up 76. For example, in the case where the lock screen illustrated in FIG. 6 has been displayed, the pop-up 76 is deleted, and the lock screen illustrated in FIG. 4 is displayed. However, in the case where the pop-up 76 is not displayed, the display of the display 14 does not change. Then, when the pop-up 76 is deleted in step S25, the touch area buffer 338 stores the coordinate data corresponding to the displayed key. In other words, when the processor 30 determines that the mobile phone 10 is no longer put in the pocket, the effective area of the touch panel 16 changes from the entire touch panel 16 to the key display area. The processor 30 that performs the process of step S25 functions as a deletion unit.

Subsequently, in step S27, the processor 30 determines whether the display has been deleted. For example, the processor 30 determines whether the release operation has been performed while the lock screen is displayed, and accordingly, the lock screen has been deleted and the display flag 346 has been turned on. If "NO" in step S27, for example, when the lock screen is displayed while the mobile phone 10 is held by the user, the processor 30 returns to the process of step S9.

For example, if the operation lock screen is displayed after the release operation has been performed to delete the lock screen, the display flag 346 is turned off once. Thus, the determination is "YES" in step S27, and in step S29, the processor 30 powers off the proximity sensor 24 and the illumination sensor 26. In other words, the processor 30 does not need to determine whether the mobile phone 10 is put in the pocket, and accordingly, the two sensors are powered off. Then, when the process of step S29 ends, the processor 30 ends the notification control process. The processor 30 that performs the process of step S29 functions as a second controller.

If the event that has occurred is an incoming call, or, if "YES" in step S7, in step S31 illustrated in FIG. 11, the processor 30 determines whether the proximity of an object has been detected as in step S9. If "YES" in step S31, or, when the proximity of an object is detected, in step S33, the processor 30 determines whether the surrounding area of the mobile phone 10 is dark as in step S11. If "NO" in step S31 or S33, or, when the proximity of an object has not been detected or the surrounding area of the mobile phone 10 is bright, the processor 30 performs the process of step S47 described below and then ends the notification control process. In other words, at the time when an incoming call is received, the processor 30 determines that the mobile phone 10 is not put in the pocket, and thus, the notification control process ends. If an incoming call is being received at the time when the notification control process ends, the touch operation control process is performed to determine whether to limit the touch operation on the touch panel 16 using the proximity sensor 24.

If "YES" in step S33, or, when the proximity of an object has been detected and the surrounding area of the mobile phone 10 is dark, the processor 30 proceeds to the process of step S35. In other words, the processor 30 determines that the mobile phone 10 is put in the pocket. After such a determination, in step S35, the processor 30 determines whether a touch operation has been performed as in step S13. If "NO" in step S35, or, when the touch operation has not been performed, the processor 30 proceeds to the process of step S41. If the determination is "YES" in step S33, as in the case in which the determination is "YES" in step S11, the entire touch panel 16 is the effective area for the touch operation.

If "YES" in step S35, or, when the touch operation is performed, the processor 30 displays the pop-up 76 illustrated in FIG. 7 in step S37, and performs the vibration notification process in step S39.

Subsequently, in step S41, the processor 30 determines whether the proximity of an object is no longer detected as in step S19. If "NO" in step S41, or, when the proximity of an object has been detected, in step S43, the processor 30 determines whether the display has been deleted. For example, the processor 30 determines whether the power supply key 22b has been operated, and accordingly, the display flag 346 has been turned off. If "YES" in step S43, when a voice transmission signal is no longer received so that the incoming call flag 350 is turned off, and when the incoming call screen is deleted, the processor 30 proceeds to the process of step S29.

If "NO" in step S43, or, when the display has not been deleted, the processor 30 returns to the process of step S35. After that, if the determination is "YES" in step S41, or, when the proximity of an object is no longer detected, the processor 30 deletes the pop-up 76 in step S45. In other words, when the pop-up 76 is deleted in the incoming call screen illustrated in FIG. 7, the display 14 displays the incoming call screen illustrated in FIG. 4. Then, when the pop-up 76 is deleted in step S45, as in the case in which the pop-up 76 is deleted in the process of step S25, the effective area of the touch panel 16 changes from the entire touch panel 16 to the key display area. The processor 30 that perform is the process of step S45 functions as a deletion unit.

Subsequently, in step S47, the processor 30 powers off the illumination sensor 26. In other words, since the illumination sensor 26 is not necessary, the processor 30 powers off the illumination sensor 26. Then, when the process of step S47 ends, the processor 30 ends the notification control process. A normal incoming call screen is displayed, and accordingly, the touch operation on the touch panel 16 may be limited by the touch operation control process described above. The processor 30 that performs the process of step S47 functions as a third controller.

The processor 30 that performs the processes of steps S15 and S37 functions as a pop-up processing unit.

FIG. 12 illustrates a flowchart of the lock state control process. When the display 14 is powered on in the case where the lock state is set, the lock state control process starts. In step S61, the processor 30 turns on the high-sensitivity flag 352. In other words, the processor 30 sets the sensitivity of the touch panel 16 to the high-sensitivity mode. Subsequently, in step S63, the processor 30 displays the lock screen. For example, the display 14 displays the lock screen illustrated in FIG. 4. When the lock screen is displayed, the touch area buffer 338 stores the coordinate data indicating the display ranges of the start key 70 and the telephone key 72. However, when the processor 30 determines that the mobile phone 10 is put in the pocket, the touch area buffer 338 stores the coordinate data indicating the entire touch panel 16.

Subsequently, in step S65, the processor 30 determines whether the release operation has been performed. For example, the processor 30 determines whether the tap operation has been performed on the start key 70 or the telephone key 72. If the processor 30 determines that the mobile phone 10 is put in the pocket, the release operation is not accepted as an effective operation.

If "NO" in step S65, or, when the release operation has not been performed, in step S67, the processor 30 determines whether the display has been deleted. For example, the processor 30 determines whether the lock screen has been deleted by powering off the display 14 after a lapse of a predetermined period of time without an operation performed. Specifically, the processor 30 determines whether the display flag 346 has been turned off. If "YES" in step S67, for example, when the power supply key 22b is operated to delete the lock screen, the processor 30 proceeds to the process of step S75. If "NO" in step S67, or, when the lock screen has been displayed, the processor 30 returns to the process of step S65. If "YES" in step S65, or, when the start key 70 is operated, the processor 30 turns off the lock flag 348 in step S69. In other words, the lock state is released.

Subsequently, in step S71, the processor 30 determines whether the operation has been performed with gloves. In other words, in the touch operation performed as the release operation, the processor 30 determines whether an amount of change in capacitance is smaller than a first threshold. An amount of change in capacitance is read from the touch buffer 334. If "NO" in step S71, for example, when the release operation has been performed with bare hands and an amount of change in the capacitance stored in the touch buffer 334 is greater than the first threshold, in step S73, the processor 30 turns off the high-sensitivity flag 352. In other words, the processor 30 sets the sensitivity of the touch panel 16 to the normal mode. Then, when the process of step S73 ends, the processor 30 proceeds to the process of step S75. If "YES" in step S71, for example, when the release operation has been performed with gloved hand and an amount of change in capacitance is smaller than the first threshold, the processor 30 proceeds to the process of step S75. In other words, the high-sensitivity mode remains set.

Subsequently, in step S75, the processor 30 deletes the lock screen. In other words, since the lock state has been released, the lock screen is deleted to display the next screen (for example, the operation lock screen). Then, when the process of step S75 ends, the processor 30 ends the lock state control process.

FIG. 13 illustrates a flowchart of the incoming call control process. For example, when the incoming call flag 350 is turned on, the incoming call control process starts. In step S91, the processor 30 determines whether the lock state has been set. In other words, the processor 30 determines whether the lock flag 348 has been turned on. If "NO" in step S91, or, when the lock state has not been set, the processor 30 proceeds to the process of step S95. If "YES" in step S91, or, when the lock state has been set and the lock flag 348 has been turned on, in step S93, the processor 30 turns on the high-sensitivity flag 352 as in step S61.

Subsequently, in step S95, the processor 30 determines whether the display 14 has been powered on. In other words, an incoming call may be received while the display 14 is powered off. Thus, before displaying the incoming call screen, the processor 30 determines whether the display 14 has been powered on in step S5 of the notification control process. If "NO" in step S95, or, when the display 14 has been powered off, the processor 30 repeats the process of step S95. If "YES" in step S95, or, when the display 14 has been powered on, in step S97, the processor 30 displays the incoming call screen. For example, the display 14 displays the incoming call screen illustrated in FIG. 3. Together with the display of the incoming call screen, the speaker 18 outputs a ringtone, and accordingly, the vibrator 50 operates. When the incoming call screen is displayed, the touch area buffer 338 stores the coordinate data indicating the display ranges of the incoming telephone key 64 and the hold key 66. However, if the processor 30 determines that the mobile phone 10 is put in the pocket, the touch area buffer 338 stores the coordinate data indicating the entire touch panel 16.

Subsequently, in step S99, the processor 30 determines whether an incoming call operation has been performed. For example, the processor 30 deter mines whether the tap operation has been performed on the incoming telephone key 64. If "YES" in step S99, or, when the tap operation is performed on the incoming telephone key 64, in step S101, the processor 30 perform is the call process. In other words, the mobile phone 10 can communicate with the party's telephone. Then, when the process of step S101 ends, the processor 30 proceeds to the process of step S109. If "NO" in step S99, or, when the call operation has not been performed, in step S103, the processor 30 determines whether a hold operation has been performed. For example, the processor 30 determines whether the tap operation has been performed on the hold key 66. If "YES" in step S103, for example, when the tap operation is performed on the hold key 66, in step S105, the processor 30 performs the hold process. For example, a message informing that a communication cannot be currently performed is transmitted to the party's telephone. Then, when the process of step S105 ends, the processor 30 proceeds to the process of step S109. However, if it is determined that the mobile phone 10 is put in the pocket, the call incoming operation or the hold operation cannot be accepted as an effective operation.

If "NO" in step S103, or, when the hold operation is not performed, in step S107, the processor 30 determines whether the incoming call flag 350 has been turned off. In other words, the processor 30 determines whether a voice transmission signal is no longer received and whether the incoming call flag 350 has been turned off. If "NO" in step S107, or, when a voice transmission signal has been received and the incoming call flag 350 has been turned on, the processor 30 returns to the process of step S99.

If "YES" in step S107, for example, when a voice transmission signal is no longer received and the incoming call flag 350 has been turned off, in step S109, the processor 30 deletes the incoming call screen. In other words, the incoming call screen is deleted in order to display the next screen. Also, together with the deletion of the incoming call screen, a ringtone output is stopped, and accordingly, the vibrator 50 is stopped. Then, when the process of step S109 ends, the processor 30 ends the incoming call control process. When the incoming call control process ends, the display 14 displays a call screen, a hold screen, a lock screen, a home screen, or any other screen.

The processor 30 that performs the processes of steps S69, S101, and S105 functions as an execution unit.

Second Embodiment

In a second embodiment, when it is determined that the mobile phone 10 is put in the pocket, the pop-up 76 is displayed even if no touch operation is detected. The external appearance, electrical configuration, and the like of the mobile phone 10 are approximately the same as those of the first embodiment, and thus will not be described here in detail.

For example, when the proximity sensor 24 detects the proximity of an object and the illumination detected by the illumination sensor 26 is smaller than a predetermined value while the mobile phone 10 is put in the pocket, the menu key 22a is operated to display the lock screen, and also, the pop-up 76 is displayed together.

Similarly, when the mobile phone 10 receives an incoming call while being put in the pocket, the incoming call screen is displayed, and also, the pop-up 76 is displayed.

In the second embodiment, thus, if the user inadvertently hides the proximity sensor 24 and the illumination sensor 26 with the finger or the like, the user can notice such a situation by merely looking at the display 14.

The characteristics of the second embodiment have been described above. The second embodiment will now be described with reference to the flowchart illustrated in FIGS. 14 and 15.

Figure 14:
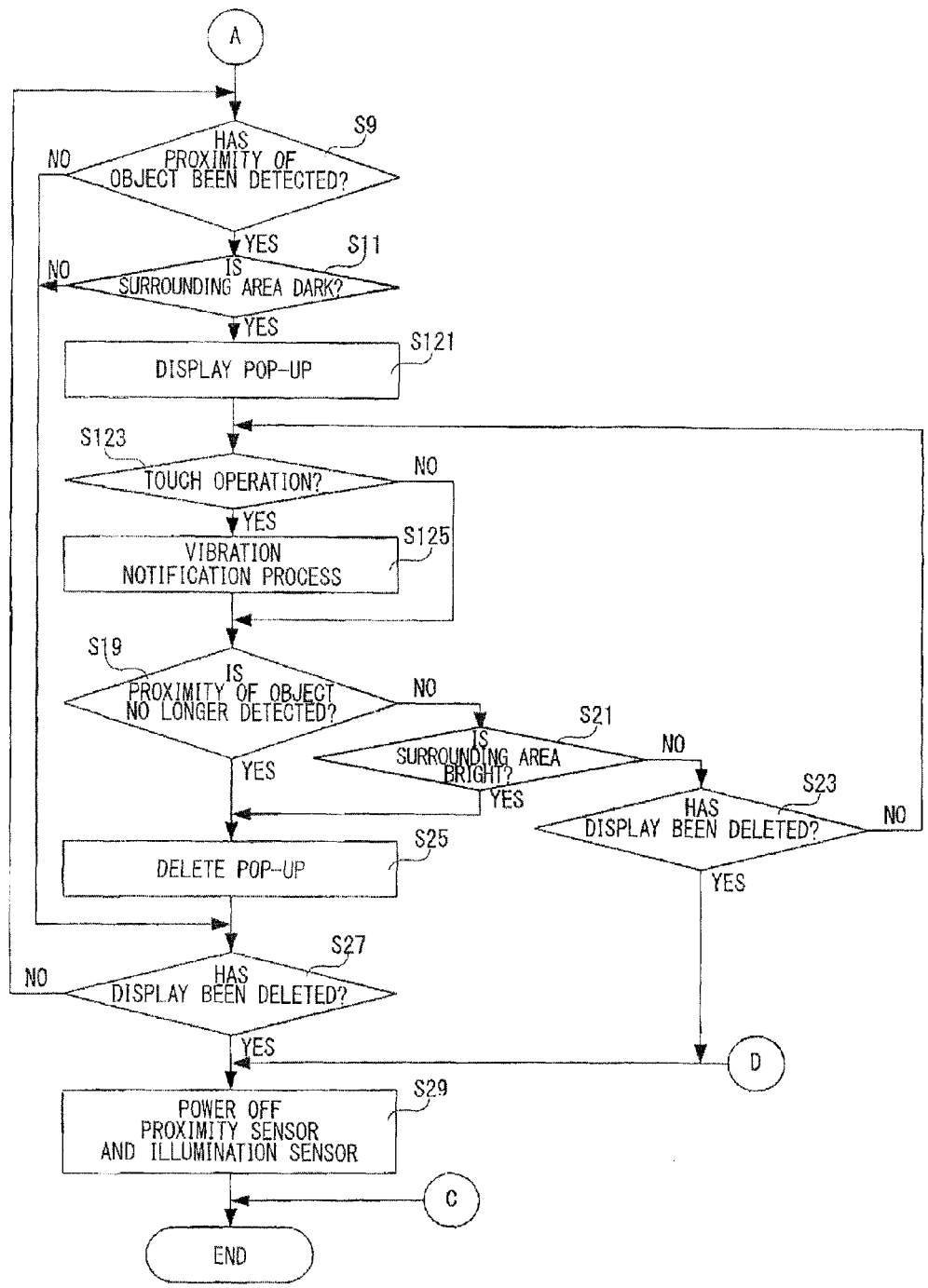
FIG. 14 illustrates a flowchart showing an example of a notification control process according to a second embodiment by a processor.

FIG. 14 illustrates a part of the flowchart of a notification control process according to the second embodiment, and FIG. 15 illustrates the other part of the flowchart of the notification control process according to the second embodiment. The processes of steps S1 to S7 of the notification control process of the second embodiment are identical to those of the first embodiment, which will not be described here. Also, the processes of steps S9 to S11, S19 to S33, and S41 to S47 are approximately the same as those of the first embodiment, which will not be described here in detail.

When the notification control process of the second embodiment is performed, and, for example, it is determined that the mobile phone 10 is put in the pocket after the lock screen is displayed, or, if "YES" in step S11, the processor 30 displays the pop-up 76 in step S121. For example, as illustrated in FIG. 6, the pop-up 76 is displayed on the lock screen in an overlapping manner.

Subsequently, in step S123, the processor 30 determines whether the touch operation has been performed. For example, the processor 30 determines whether the touch operation has been performed on the lock screen on which the pop-up 76 is displayed. If "NO" in step S123, or, when the touch operation is not performed, the processor 30 proceeds to the process of step S19. If "YES" in step S123, or, when the touch operation is performed, in step S125, the processor 30 performs the vibration notification process. In other words, the processor 30 performs the vibration notification process in response to the touch operation.

When the process of step S125 ends, the processor 30 performs the processes of steps S19 to S29 as in the first embodiment. In this case, if "NO" in step S23, or, when the state of the mobile phone 10 has not been changed, the processor 30 returns to the process of step S123.

When the notification control process of the second embodiment is performed, and when the processor 30 determines that the mobile phone 10 is put in the pocket after the incoming call screen is displayed, or, if "YES" in step S33, the processor 30 displays the pop-up 76 in step S141. For example, as illustrated in FIG. 7, the pop-up 76 is displayed on the display 14 while overlapping the incoming call screen.

Subsequently, in step S143, the processor 30 determines whether the touch operation has been performed. In other words, the processor 30 determines whether the touch operation has been performed on the incoming call screen on which the pop-up 76 is displayed. If "NO" in step S143, for example, when the touch operation has not been performed, the processor 30 proceeds to the process of step S41. If "YES" in step S143, or, when the tap operation or any other operation is performed on the incoming call screen on which the pop-up 76 is displayed, the processor 30 performs the vibration notification process in step S145. In other words, the vibration notification process is performed in response to the tap operation.

When the process of step S145 ends, the processes of steps S41 to S47 are performed as in the first embodiment. In this case, if "NO" in step S43, or, when the state of the mobile phone 10 has not been changed, the processor 30 returns to the process of step S143.

The processor 30 that performs the processes of steps S15, S17, S37, S39, S125, and S145 functions as a notification unit. In particular, the processor 30 that performs the processes of steps S17, S39, S125, and S145 functions as a vibration notification unit. In the second embodiment, the processor 30 that performs the processes of steps S121 and S141 functions as a pop-up display processing unit.

Although whether the mobile phone 10 is put in the pocket is determined using the proximity sensor 24 and the illumination sensor 26 while an incoming call is received, whether the mobile phone 10 is put in the pocket may be determined without using the illumination sensor 26.

Figure 16:
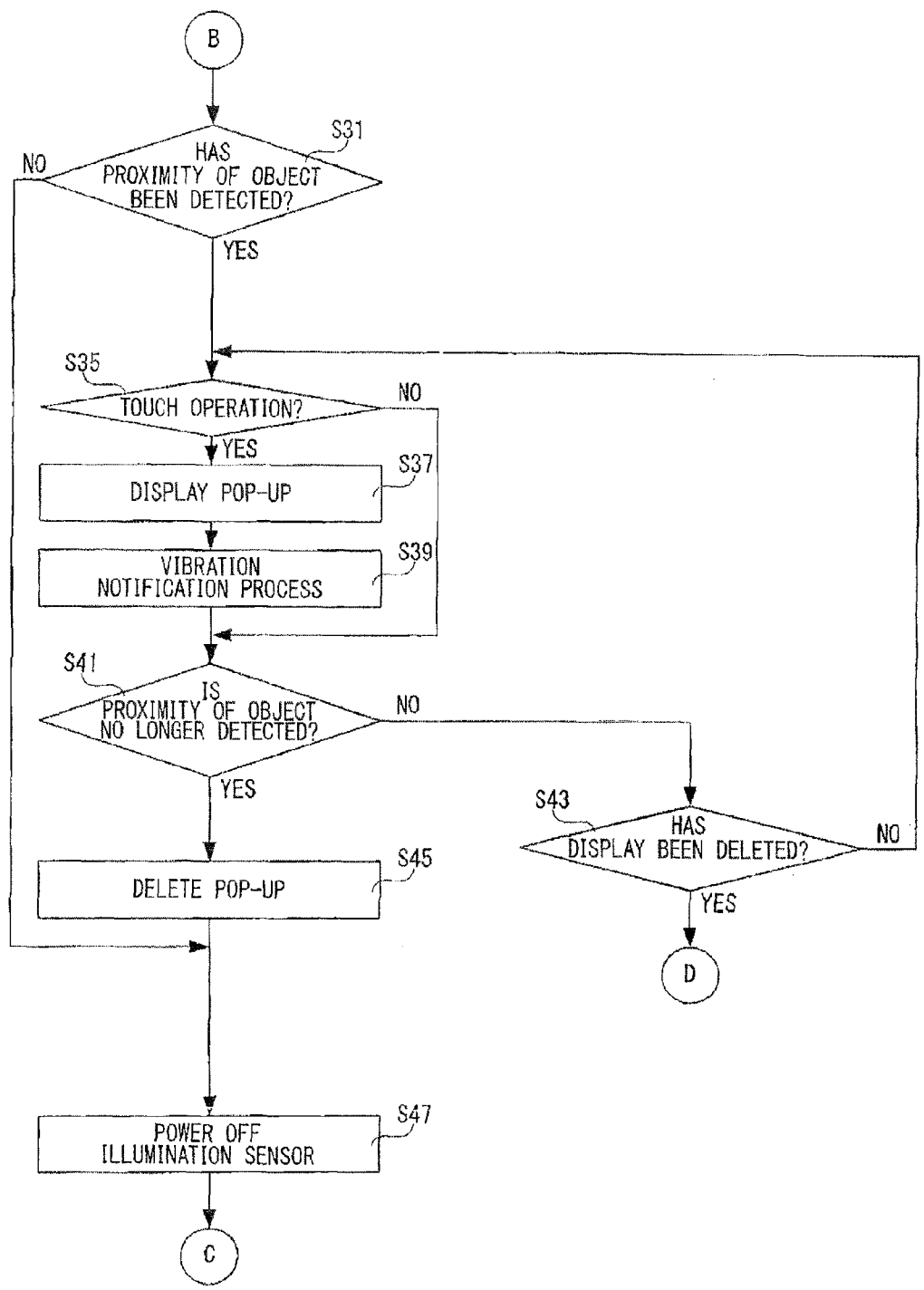
FIG. 16 illustrates a flowchart showing an example of a notification control process according to another embodiment by the processor.

Specifically, with reference to FIG. 16, the process of step S33 for determining the ambient brightness, or, the step performed using the illumination sensor 26 is omitted in the notification control process. Thus, if "YES" in step S31, or, when the proximity of an object has been detected, the processor 30 performs the process of step S35 and the following steps. In other words, if "YES" in step S31, or, when the proximity of an object has been detected, the processor 30 determines that the mobile phone 10 is put in the pocket.

Also at the occurrence of an event other than an incoming call, whether the mobile phone 10 is put in the pocket may be determined without using the illumination sensor 26. In this case, the processes of steps S11 and S21 are omitted in the notification control process.

The event may comprise the notification by an alarm and the reception of an email. The pop-up 76 is thus displayed on, for example, an alarm screen and an email reception screen.

Although, for example, the pop-up 76 is displayed or the vibrator 50 is operated as a specific notification, the specific notification may be provided through an appropriate combination of, for example, a voice and light of LEDs or the like.

The user may appropriately set the high-sensitivity mode and the normal mode. Moreover, when the high-sensitivity mode is set, an icon indicating the high-sensitivity mode may be displayed in the status display area 60. Then, the high-sensitivity mode may be set constantly.

The proximity sensor 24 and the illumination sensor 26 may be powered on constantly. In this case, whether the mobile phone 10 is put in the pocket may be determined irrespective of the timing at which an event occurs.

As in the first embodiment, the vibration notification process (steps S17 and S39) may be omitted in the case in which the processes other than the vibration notification process, such as the display of a pop-up, are performed upon detection of the touch operation in the notification control process.

For example, a light emission notification process using light emission of LEDs or the like or a sound notification process using a sound from a speaker may be performed in place of the vibration notification process. In other words, light, sound, or the like is used to notify the user that a touch operation has been detected. The notifications by vibration, light, sound, and the like may be combined appropriately.

As described above, the processor 30 simultaneously performs the notification control process, the lock state control process, and the incoming call control process. Thus, the processor 30 simultaneously performs the respective steps included in the processes.

The steps are repeated at regular intervals (for example, a period of time shorter than one second) in the processes described with reference to the flowcharts, which may be repeated at intervals longer than the regular intervals.

Although the phrase "greater than" has been used for thresholds such as predetermined values, the phrase "greater than a threshold" also means "greater than or equal to a threshold". Also, the phrase "smaller than a threshold" also means "smaller than or equal to a threshold" and "smaller than a threshold".

The programs used in the respective embodiments may be stored in a hard disk drive (HDD) such as a server for data distribution and distributed to the mobile phone 10 through a network. Alternatively, a storage medium, which stores a plurality of programs, such as an optical disk (for example, CD, DVD, or blue-ray disk (BD)), a USB memory, or a memory card, may be sold or distributed. If a program downloaded through the server and the recording medium described above is installed in a mobile phone similar in configuration to the mobile phone 10, effects similar to those of the mobile phone 1 can be achieved.

The specific numeric values in the specification are merely examples and can be changed appropriately in accordance with, for example, changes in product specifications.

While the mobile phone 10 has been described above in detail, the above description is in all aspects illustrative and not restrictive, and the present disclosure is not limited thereto. The modifications described above are applicable in combination as long as they are not mutually inconsistent. It is understood that numerous modifications which have not been exemplified can be devised without departing from the scope of the present disclosure.

What is claimed is:

1. A mobile terminal comprising:
    a display;
    a touch panel overlaying the display;
    a proximity sensor configured to detect proximity of an object;
    an illumination sensor configured to detect an illumination; and
    a processor configured to provide a specific notification upon detection of a touch operation when the proximity sensor detects the proximity of the object and the illumination is smaller than a predetermined value, wherein the specific notification comprises information displayed on the display.

2. The mobile terminal according to claim 1, wherein the processor is further configured to notify a user by vibration that a touch operation has been detected when the proximity sensor detects the proximity of the object and the illumination is smaller than the predetermined value.

3. The mobile terminal according to claim 1, wherein
the processor performs a predetermined process upon detection of a touch operation in a predetermined area of the touch panel, and
the processor provides the specific notification upon detection of a touch operation at any position in the touch panel when the proximity sensor detects the proximity of the object and the illumination is smaller than the predetermined value.

4. The mobile terminal according to claim 3,
wherein the predetermined area corresponds to an object displayed on the display.

5. The mobile terminal according to claim 1, wherein
the processor performs a predetermined process upon detection of a touch operation in a predetermined area of the touch panel, and
the processor provides the specific notification upon detection of a touch operation in the predetermined area when the proximity sensor detects the proximity of the object and the illumination is smaller than the predetermined value.

6. The mobile terminal according to claim 5,
wherein the predetermined area corresponds to an object displayed on the display.

7. The mobile terminal according to claim 1,
wherein the information comprises a pop-up that is displayed on the display upon detection of a touch operation when the proximity sensor detects the proximity of the object and the illumination is smaller than the predetermined value.

8. The mobile terminal according to claim 7, wherein the processor causes the display to delete the pop-up when the proximity sensor no longer detects the proximity of the object or the illumination is greater than the predetermined value.

9. The mobile terminal according to claim 7, wherein the processor causes the display to delete the pop-up when the proximity sensor no longer detects the proximity of the object while the display displays an incoming call screen.

10. The mobile terminal according to claim 1, further comprising
a power supply configured to supply power,
wherein the processor powers on the proximity sensor and the illumination sensor when an event occurs.

11. The mobile terminal according to claim 10, wherein the processor powers off the proximity sensor and the illumination sensor when the proximity sensor no longer detects the proximity of the object or the illumination is greater than the predetermined value.

12. The mobile terminal according to claim 10, wherein
the event comprises an incoming call, and
the processor powers off the illumination sensor when the proximity sensor no longer detects the proximity of the object after the incoming call occurs.

13. A non-transitory computer readable recording medium that stores a notification control program for controlling a processor of a mobile terminal comprising a touch panel, a proximity sensor configured to detect proximity of an object, and an illumination sensor configured to detect an illumination, the notification control program causing the processor to execute the step of providing a specific notification upon detection of a touch operation when the proximity sensor detects the proximity of the object and the illumination is smaller than a predetermined value, wherein the specific notification comprises information displayed on a display of the mobile terminal.

14. A notification control method by a mobile terminal comprising a touch panel, a proximity sensor configured to detect proximity of an object, and an illumination sensor configured to detect an illumination,
the method comprising providing, by a processor of the mobile terminal, a specific notification upon detection of a touch operation when the proximity sensor detects the proximity of the object and the illumination is smaller than a predetermined value, wherein the specific notification comprises information displayed on a display of the mobile terminal.

* * * * *